United States Patent
Danis et al.

(10) Patent No.: US 7,360,364 B2
(45) Date of Patent: Apr. 22, 2008

(54) METHOD AND APPARATUS FOR ASSEMBLING GAS TURBINE ENGINE COMBUSTORS

(75) Inventors: Allen Michael Danis, Mason, OH (US); James Neil Cooper, Hamilton, OH (US); Jeffrey Michael Martini, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 11/015,175

(22) Filed: Dec. 17, 2004

(65) Prior Publication Data

US 2006/0130485 A1   Jun. 22, 2006

(51) Int. Cl.
   *F02C 1/00* (2006.01)
   *F02G 3/00* (2006.01)
(52) U.S. Cl. .......................................... 60/752
(58) Field of Classification Search ........... 60/752–760
   See application file for complete search history.

(56) References Cited

U.S. PATENT DOCUMENTS

| | | | |
|---|---|---|---|
| 3,990,232 A | 11/1976 | Campbell | |
| 4,896,510 A | 1/1990 | Foltz | |
| 4,912,922 A * | 4/1990 | Maclin | 60/796 |
| 5,083,422 A * | 1/1992 | Vogt | 60/782 |
| 5,181,377 A * | 1/1993 | Napoli et al. | 60/796 |
| 5,479,782 A | 1/1996 | Parker et al. | |
| 5,784,876 A * | 7/1998 | Alkabie | 60/776 |
| 5,865,030 A | 2/1999 | Matsuhama | |
| 5,970,716 A * | 10/1999 | Forrester et al. | 60/746 |
| 6,134,877 A * | 10/2000 | Alkabie | 60/800 |
| 6,250,082 B1 * | 6/2001 | Hagle et al. | 60/753 |
| 6,389,792 B1 * | 5/2002 | Hagle et al. | 60/772 |
| 6,668,559 B2 * | 12/2003 | Calvez et al. | 60/796 |
| 6,725,667 B2 | 4/2004 | Farmer et al. | |
| 6,844,520 B2 | 1/2005 | D'Andrea et al. | |
| 6,904,676 B2 | 6/2005 | Emilianowicz | |
| 6,986,201 B2 | 1/2006 | Moertle et al. | |
| 6,988,369 B2 * | 1/2006 | Conete et al. | 60/796 |
| 7,036,316 B2 * | 5/2006 | Howell et al. | 60/772 |
| 7,104,067 B2 * | 9/2006 | Bunker | 60/752 |
| 2005/0034459 A1 * | 2/2005 | McMasters et al. | 60/752 |
| 2005/0034461 A1 * | 2/2005 | McMasters et al. | 60/752 |
| 2005/0081526 A1 * | 4/2005 | Howell et al. | 60/748 |
| 2005/0103020 A1 * | 5/2005 | Mancini et al. | 60/776 |
| 2005/0229606 A1 * | 10/2005 | Bes et al. | 60/804 |
| 2006/0010879 A1 * | 1/2006 | Aumont et al. | 60/796 |
| 2006/0130486 A1 * | 6/2006 | Danis et al. | 60/752 |
| 2006/0168967 A1 * | 8/2006 | Simons et al. | 60/772 |

* cited by examiner

*Primary Examiner*—William H. Rodriguez
(74) *Attorney, Agent, or Firm*—William Scott Andes; Armstrong Teasdale LLP

(57) ABSTRACT

A method enables a combustor for a gas turbine engine to be assembled. The method includes coupling an inner liner to an outer liner such that a combustion chamber is defined therebetween, wherein the outer liner is fabricated from a plurality of panels coupled together, and coupling an outer support radially outward from the outer liner such that an outer passageway is defined between the outer liner and the outer support, wherein the outer support is configured to channel cooling air from the outer passageway towards at least a portion of the outer liner.

16 Claims, 3 Drawing Sheets

METHOD AND APPARATUS FOR ASSEMBLING GAS TURBINE ENGINE COMBUSTORS

BACKGROUND OF THE INVENTION

This invention relates generally to combustors and, more particularly to a method and apparatus for decreasing combustor acoustics.

At least some known gas turbine engines include a compressor for compressing air which is suitably mixed with a fuel and channeled to a combustor wherein the mixture is ignited for generating hot combustion gases. At least some known combustors include a dome assembly, a cowling, and inner and outer liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber. An outer support is coupled radially outward from the outer liner such that an outer cooling passage is defined radially outward from the outer liner, and an inner support is coupled radially inward from the inner liner such that an inner cooling passage is defined therebetween.

At least some known liners include a plurality of panels that are serially connected together between the upstream and aft ends of each liner such that the panels define the combustion chamber. Because the panels are exposed to high operating temperatures generated within the combustion chamber, cooling air is channeled through the cooling passages to facilitate reducing the operating temperature of the panels. Specifically, such panels rely on backside convection cooling from the cooling passage flow, as well as hot-side film cooling, to facilitate enhancing extending the useful life of the panels. However, because the aft most panel is radially inward and downstream from the outer support, the aft most panel generally receives significantly less convective cooling air than other liner panels because the outer support directs the cooling downstream through turbine cooling feed windows. Over time, the reduced cooling of the aft panel may cause the aft panel to exceed predetermined operating limits established to facilitate optimizing the useful life of the liner.

BRIEF DESCRIPTION OF THE INVENTION

In one aspect, a method for assembling a combustor for a gas turbine engine is provided. The method comprises coupling an inner liner to an outer liner such that a combustion chamber is defined therebetween, wherein the outer liner is fabricated from a plurality of panels coupled together, and coupling an outer support radially outward from the outer liner such that an outer passageway is defined between the outer liner and the outer support, wherein the outer support is configured to channel cooling air from the outer passageway towards at least a portion of the outer liner.

In another aspect, a combustor for a gas turbine engine is provided. The combustor includes an inner liner, an outer liner, and an outer support. The outer liner is coupled to the inner liner such that a combustion chamber is defined therebetween. The outer support is coupled radially outward from the outer liner such that an outer cooling passageway is defined radially outward from the outer liner. The outer support is configured to channel cooling air from the outer passageway towards at least a portion of the outer liner.

In a further aspect, a gas turbine engine is provided. The gas turbine engine includes a combustor including an inner liner, an outer liner, and an outer support. The outer liner coupled to the inner liner such that a combustion chamber is defined therebetween. The outer support is coupled radially outward from the outer liner such that an outer passageway is defined radially outward from the outer liner. The outer support is configured to channel cooling air from the outer passageway towards at least a portion of the outer liner.

DETAILED DESCRIPTION OF THE INVENTION

Figure 1:
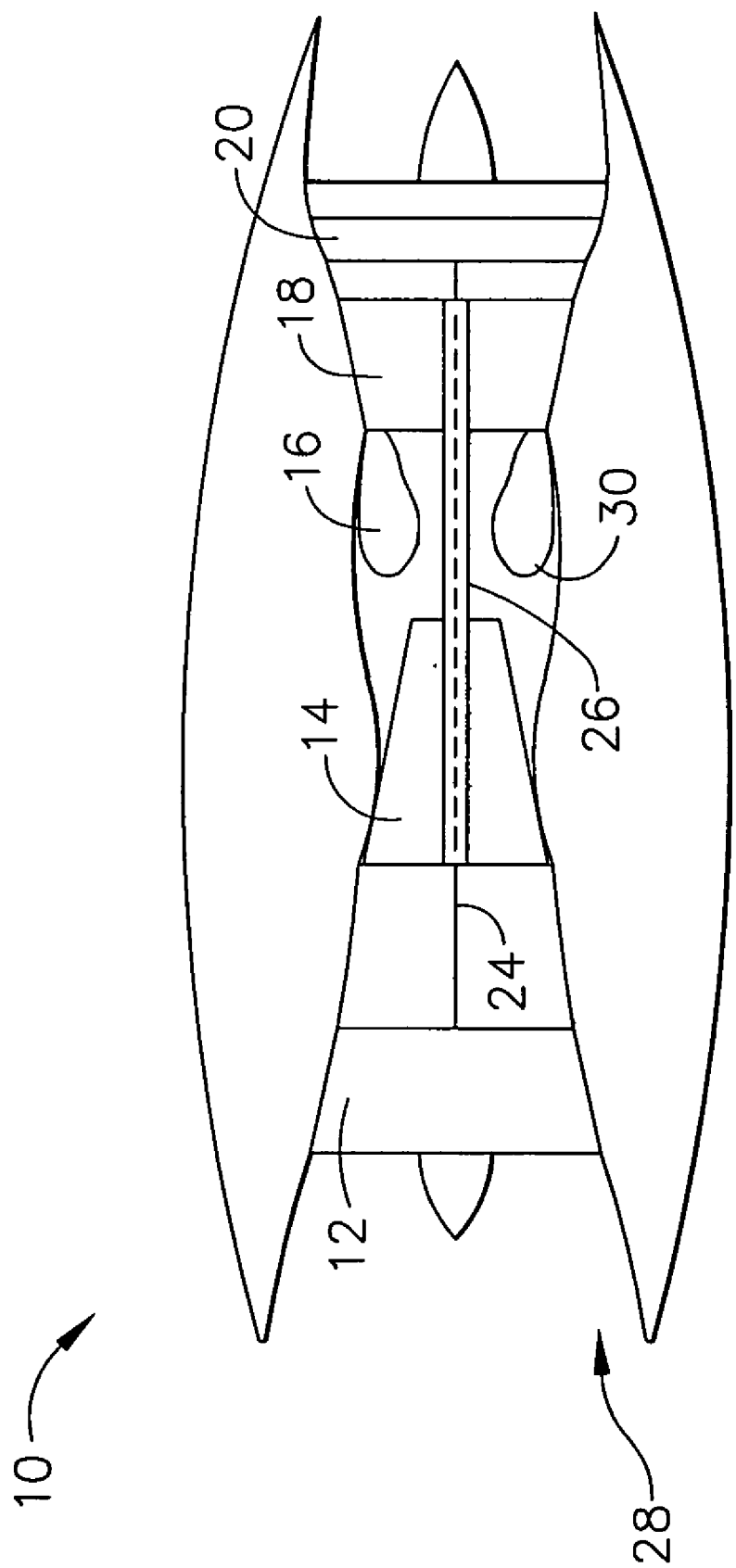
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, gas turbine engine 10 is an LMS100 engine commercially available from General Electric Company, Cincinnati, Ohio.

In operation, air flows through low pressure compressor 12 from an upstream side 28 of engine 10. Compressed air is supplied from low pressure compressor 12 to high pressure compressor 14. Highly compressed air is then delivered to combustor assembly 16 where it is mixed with fuel and ignited. Combustion gases are channeled from combustor 16 to drive turbines 18 and 20.

Figure 2:
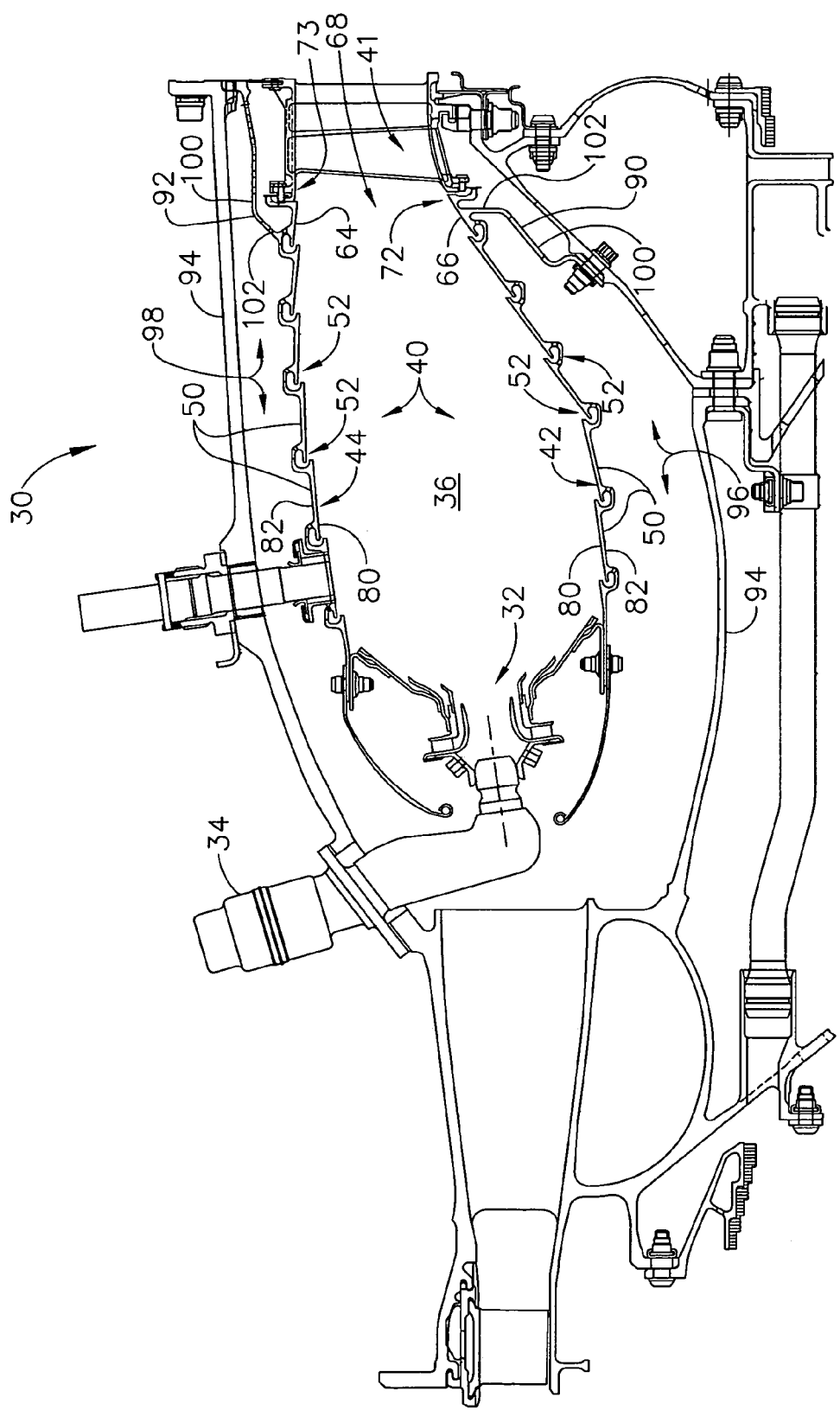
FIG. 2 is a cross-sectional view of a combustor that may be used with the gas turbine engine.
Figure 3:
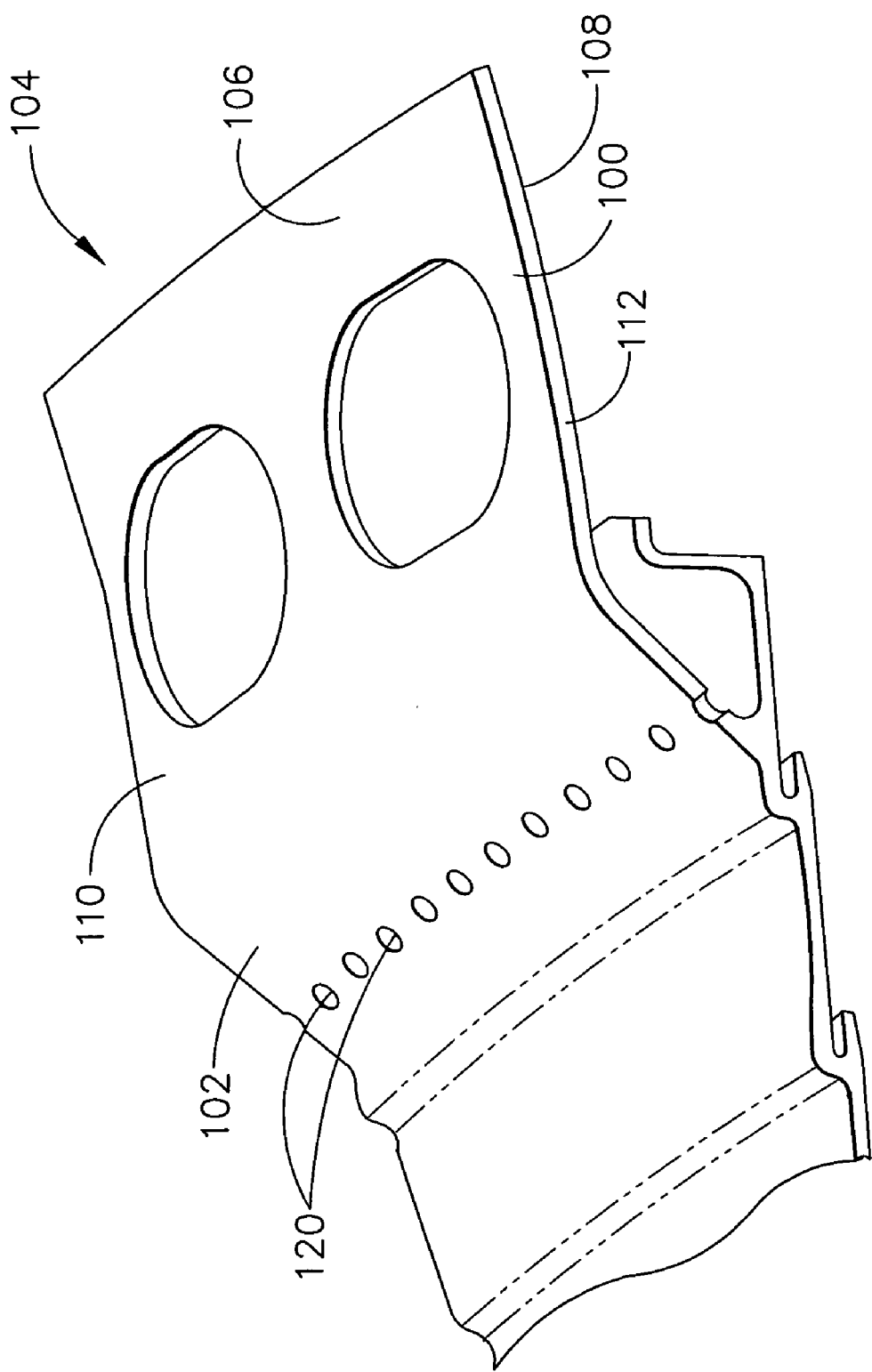
FIG. 3 is an enlarged perspective view of a portion of the combustor shown in FIG. 2.

FIG. 2 is a cross-sectional view of a combustor 30 that may be used with gas turbine engine 10. FIG. 3 is an enlarged perspective view of the portion of combustor 30 shown in FIG. 3. Combustor 30 includes a dome assembly 32. A fuel injector 34 extends into dome assembly 32 and injects atomized fuel through dome assembly 32 into a combustion zone or chamber 36 of combustor 30 to form an air-fuel mixture that is ignited downstream of the fuel injector Combustion zone 36 is defined by combustor liners 40 that shield components external to combustor 30 from heat generated within combustion zone 36. Combustion zone 36 extends from dome assembly 32 downstream to a turbine nozzle assembly 41. Liners 40 include an inner liner 42 and an outer liner 44. Each liner 42 and 44 is annular and includes a plurality of separate panels 50. In the exemplary embodiment, each panel 50 includes a series of steps 52, each of which form a distinct portion of combustor liner 40.

Outer liner 44 and inner liner 42 each include a respective aft-most panel 64 and 66. Panels 64 and 66 are each located at the aft end 68 of combustion zone 36 and are adjacent turbine nozzle assembly 41. Specifically, each panel 64 and 66 couples an aft end 70 and 72 of each respective liner 44 and 42 to turbine nozzle assembly 41. Each combustor panel 50 includes a combustor liner surface 80 and an exterior surface 82 that is radially outward from liner surface 80.

Combustor liner surface 80 extends generally from dome assembly 32 to turbine nozzle assembly 41.

Each liner 42 and 44 also includes an annular support mount, or aft mount, 90 and 92, respectively. Specifically, each support mount 90 and 92 couples an aft end 72 and 70 of each respective liner 42 and 44 to turbine nozzle assembly 41 and to a combustor casing 94 extending substantially circumferentially around combustor 30. More specifically, each support mount 90 and 92 extends radially outward from each respective liner 42 and 44 such that a radially outer cooling passageway 96 and a radially outer cooling passageway 98 are defined between combustor casing 94 and combustor liner 40. Accordingly, cooling passageway 96 is adjacent liner 42, and cooling passageway 98 is adjacent liner 44.

Each support mount 90 and 92 includes a radial portion 100 and a conical datum area 102. Each radial portion 100 extends generally axially downstream from each conical datum area 102. A plurality of turbine cooling feed windows 104 that extend between a radially outer surface 106 and a radially inner surface 108 of each support mount 90 and 92. In the exemplary embodiment, windows 104 are spaced circumferentially between circumferential sides 110 and 112 of each mount 90 and 92. During operation, turbine cooling feed windows 104 facilitate channeling cooling air from cooling passageways 96 and 98 towards nozzle assembly 41.

Each conical datum area 102 extends between each radial portion 100 and each aft combustor liner panel 64 and 66. More specifically, each conical datum area 102 extends obliquely downstream, with respect to an axis of rotation of gas turbine engine 10, from each aft combustor liner panel 64 and 66. Each conical datum area 102 includes a plurality of cooling openings 120 extending therethrough. In the exemplary embodiment, cooling openings 120 are each substantially circular and are spaced substantially equidistantly between mount sides 110 and 112. However, it should be understood that openings 120 may be any desired shape and/or configuration. Accordingly, each opening 120 is aligned obliquely with respect to an outer surface 106 of each mount 90 and 92.

During operation, cooling air is channeled into cooling passageways 96 and 98 to facilitate backside cooling of liners 40. Specifically, cooling air from passageways 96 and 98 facilitates backside convective cooling and film cooling of panels 50. Because aft panels 64 is downstream from outer mount 92, if not for openings 120, mount 92 may inhibit the flow of convective cooling air towards aft panel 64. However, openings 120 facilitate augmenting backside convection cooling of panels 64. Specifically, cooling air is channeled from cooling passage 98 through openings 120 wherein it is directed in an oblique direction for impingement against a exterior surface 82 to facilitate convective cooling of panels 64. More specifically, openings 120 are oriented to ensure cooling air directed therethrough impinges on an axial center of each aft panel 64 to facilitate reducing an operating temperature of each panel 64. The enhanced cooling of aft panel 64 facilitates increasing a heat transfer coefficient of surface 82, thus extending the useful life of combustor 30 in comparison to a combustor having a mount without openings 120.

The above-described gas turbine engine combustor includes a radial outer support that includes a plurality of cooling openings extending therethrough. The cooling openings enable cooling fluid from the outer cooling passage to be channeled towards the aft most combustor liner panel to facilitate reducing the operating temperature of that panel. Specifically, the cooling openings are oriented to enable cooling air discharged therefrom to impinge against the backside of the aft-most radially-outer liner panel. As such, backside convective and/or impingement cooling of the aft-most panel is facilitated to be increased in a cost-effective and reliable manner.

Exemplary embodiments of a combustor for a gas turbine engine are described above in detail. The systems and assembly components of the combustor are not limited to the specific embodiments described herein, but rather, components of each system may be utilized independently and separately from other components described herein. Each system and assembly component can also be used in combination with other combustor systems and assemblies or with other gas turbine engine components.

While the invention has been described in terms of various specific embodiments, those skilled in the art will recognize that the invention can be practiced with modification within the spirit and scope of the claims.

What is claimed is:

1. A method for assembling a combustor for a gas turbine engine, said method comprising:
    coupling an inner liner to an outer liner such that a combustion chamber is defined therebetween, wherein the outer liner is fabricated from a plurality of panels coupled together; and
    coupling an outer support radially outward from the outer liner such that an outer passageway is defined between the outer liner and the outer support;
    wherein the outer support includes at least one aperture for channeling at least a first portion of cooling air flowing through the outer passageway downstream towards a turbine nozzle assembly coupled to the inner and outer liners and is configured to channel at least a second portion of the cooling air from the outer passageway towards at least a portion of the outer liner.

2. A method in accordance with claim 1 wherein coupling an outer support radially outward from the outer liner further comprises positioning the outer support to channel cooling air towards at least an aft-most one of the plurality of outer liner panels.

3. A method in accordance with claim 1 wherein coupling an outer support radially outward from the outer liner further comprises positioning the outer support to channel airflow towards a radially outer surface of at least one of the plurality of panels.

4. A method in accordance with claim 1 wherein coupling an outer support radially outward from the outer liner further comprises positioning the outer support to channel airflow in an oblique direction towards a radially outer surface of at least one of the plurality of panels.

5. A method in accordance with claim 1 wherein coupling an outer support radially outward from the outer liner further comprises coupling an outer support radially outward from the outer liner wherein the outer support is configured to channel the at least second portion of the cooling air from the outer passageway towards at least a portion of the outer liner through a plurality of openings extending through the outer support.

6. A combustor for a gas turbine engine, said combustor comprising:
    an inner liner;
    an outer liner coupled to said inner liner to define a combustion chamber therebetween;
    a downstream end of each of said inner and outer liners coupled to a turbine nozzle assembly; and an outer support coupled radially outward from said outer liner such that an outer cooling passageway is defined radially outward from said outer liner;

wherein said outer support includes at least one aperture for channeling at least a first portion of cooling air flowing through said outer passageway downstream towards the turbine nozzle assembly, said outer support is configured to channel at least a second portion of the cooling air from said outer passageway towards at least a portion of said outer liner.

7. A combustor in accordance with claim 6 wherein said outer liner comprises a plurality of panels coupled together, said outer support is further configured to channel cooling air towards at least an aft most one of said plurality of panels.

8. A combustor in accordance with claim 7 wherein said aft most one of said plurality of panels comprises a radially inner surface and an opposite radially outer surface, said outer support is configured to channel airflow towards said radially outer surface.

9. A combustor in accordance with claim 7 wherein said aft most one of said plurality of panels comprises a radially inner surface and an opposite radially outer surface, said outer support is configured to enhancing convective cooling of said radially outer surface.

10. A combustor in accordance with claim 7 wherein said aft most one of said plurality of panels comprises a radially inner surface and an opposite radially outer surface, said outer support is configured to channel airflow towards said radially outer surface in an oblique direction with respect to said radially outer surface.

11. A combustor in accordance with claim 7 wherein said outer support comprises a radially outer side, a radially inner side, and a plurality of openings extending therethrough to channel cooling air towards at least an aft most one of said plurality of panels.

12. A gas turbine engine comprising a turbine nozzle assembly and a combustor comprising an inner liner, an outer liner, and an outer support, said outer liner coupled to said inner liner such that a combustion chamber is defined therebetween, a downstream end of each of said inner and outer liners is coupled to said turbine nozzle assembly, said outer support coupled radially outward from said outer liner such that an outer passageway is defined radially outward from said outer liner, said outer support comprising at least one aperture for channeling at least a first portion of cooling air flowing through said outer passageway towards said turbine nozzle assembly, said outer support is configured to channel at least a second portion of the cooling air from said outer passageway towards at least a portion of said outer liner.

13. A gas turbine engine in accordance with claim 12 wherein said combustor outer liner comprises a plurality of panels coupled together, said outer support is further configured to channel cooling air towards at least an aft-most one of said plurality of panels.

14. A gas turbine engine in accordance with claim 13 wherein said aft-most one of said plurality of panels comprises a radially inner surface and an opposite radially outer surface, said outer support is configured to channel airflow towards said radially outer surface.

15. A gas turbine engine in accordance with claim 13 wherein said aft-most one of said plurality of panels comprises a radially inner surface and an opposite radially outer surface, said outer support is configured to enhancing convective cooling of said radially outer surface.

16. A gas turbine engine in accordance with claim 13 wherein said aft-most of said plurality of panels comprises a radially inner surface and an opposite radially outer surface, said outer support is configured to channel airflow towards said radially outer surface in an oblique direction with respect to said radially outer surface.

\* \* \* \* \*